United States Patent [19]

Martens et al.

[11] Patent Number: 4,631,229
[45] Date of Patent: Dec. 23, 1986

[54] ARTICLE HAVING A COATING PREPARED FROM RADIATION CURABLE POLY(VINYL CHLORIDE) RESIN COMPOSITION

[75] Inventors: John A. Martens; Brian H. Williams, both of White Bear Lake, Minn.

[73] Assignee: Minnesota Mining and Manufacturing Company, St. Paul, Minn.

[21] Appl. No.: 769,369

[22] Filed: Aug. 26, 1985

Related U.S. Application Data

[62] Division of Ser. No. 501,270, Jun. 6, 1983, Pat. No. 4,559,382.

[51] Int. Cl.$^4$ ............................ C09U 7/02; B32B 27/32
[52] U.S. Cl. ..................................... 428/343; 428/375; 428/461; 428/523; 524/535
[58] Field of Search ............... 428/343, 523, 375, 461

[56] References Cited

U.S. PATENT DOCUMENTS

| | | | |
|---|---|---|---|
| B 476,776 | 3/1976 | Bohm et al. | 204/159.16 |
| 3,351,604 | 11/1967 | Safford et al. | 260/31.8 |
| 3,359,193 | 12/1967 | Pinner | 204/159.17 |
| 3,376,246 | 2/1966 | Valentine et al. | 260/31.6 |
| 3,539,488 | 11/1970 | Klopfer et al. | 204/159.17 |
| 3,600,359 | 8/1971 | Miranda | 260/77.5 |
| 3,652,733 | 3/1972 | Davenport | 260/884 |
| 3,700,624 | 10/1972 | Adachi et al. | 260/31.6 |
| 3,912,605 | 10/1975 | Nishio et al. | 204/159.14 |
| 4,057,431 | 11/1977 | Finelli et al. | 96/115 R |

*Primary Examiner*—P. C. Ives
*Attorney, Agent, or Firm*—Donald M. Sell; James A. Smith; David L. Weinstein

[57] ABSTRACT

Articles prepared from radiation-curable poly(vinyl chloride) resin compositions containing an ethylenically-unsaturated compound having carbonylamino or thiocarbonylamino groups. These articles are dimensionally stable, clear, and do not exude oily materials.

14 Claims, No Drawings

ARTICLE HAVING A COATING PREPARED FROM RADIATION CURABLE POLY(VINYL CHLORIDE) RESIN COMPOSITION

This is a division of application Ser. No. 501,270 filed June 6, 1983, now U.S. Pat. No. 4,559,382.

This invention relates to radiation-curable poly(vinyl chloride) resin compositions that can be processed to form shaped articles, coatings, and films.

Poly(vinyl chloride) resins prepared by the polymerization of vinyl chloride with a minor amount of a copolymerizable vinyl compound are widely used in various technical fields to make shaped articles because of their desirable mechanical and chemical properties. Poly(vinyl chloride) resins, however, are generally characterized by low impact strength. To remedy this shortcoming, radiation curing of compositions of poly(vinyl chloride) resins containing various plasticizers and crosslinking agents has been utilized. Pinner, U.S. Pat. No. 3,359,193, discloses the incorporation of ethylenically-unsaturated compounds into chlorinated polymers, particularly polyvinyl chloride, to reduce processing temperatures while still yielding compositions which, on exposure to radiation, provide an essentially rigid polymer. This patent discloses that when the ethylenically-unsaturated compound is polyfunctional, crosslinking occurs. Polyethylene oxide dimethacrylate is included among suitable compounds for providing crosslinking; however, films made using polyethylene oxide dimethacrylate are cloudy and, on storage, exude an oily material. Klopfer, et al, U.S. Pat. No. 3,539,488, discloses the incorporation of a polyfunctional unsaturated monomer, e.g., trimethylol-propane trimethacrylate or triallyl isocyanurate, into polyvinyl halide resins, the extrusion or molding of the composition into any desired shape, and the curing of the shaped article by high energy radiation to form a rigid crosslinked article. Nishio, et al, U.S. Pat. No. 3,912,605, discloses compositions, crosslinked by ionizing radiation, of a vinyl chloride resin containing the reaction product of a conjugate diene polymer with another vinyl compound that has been epoxidized and then reacted with an acrylic acid leaving residual epoxide groups, which groups act as an internal stabilizer for the polyvinyl chloride. Bohm, et al, U.S. patent application No. B476,776 (laid open, Mar. 23, 1976), discloses compositions, crosslinked by electron beam radiation at doses of 0.1 to 10 MRads, of a vinyl chloride resin containing compounds such as ethoxylated bisphenol-A dimethacrylate.

This invention involves radiation-curable poly(vinyl chloride) resin compositions containing a polymerizable and/or crosslinkable compound having (a) two or more, preferably up to six, terminal or pendant ethylenically-unsaturated groups (i.e., vinylidene,

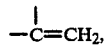

or preferably, vinyl), (b) two or more groups, preferably up to six, selected from divalent carbonylamino groups (i.e.,

divalent thiocarbonylamino groups (i.e.,

or both, wherein X preferably represents a member selected from the group consisting of oxygen atom, (i.e., —O—), sulfur atom (i.e., —S—), and amino group (e.g., —NH—, —N(CH$_3$)—), and (c) one polyvalent aliphatic group, which is the residue of a polymerizable monomeric or oligomeric nucleophilic compound after the removal of the hydroxyl, amino, or thiol groups thereof, with the proviso that there is at least one divalent carbonylamino or thiocarbonylamino group per ethylenically-unsaturated group. In the preferred embodiments of this invention, the carbonylamino groups or thiocarbonylamino groups of these polymerizable and/or crosslinkable compounds are bonded directly to the polyvalent aliphatic group and connected indirectly to the ethylenically-unsaturated groups. Included among these carbonylamino and thiocarbonylamino groups are:

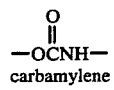
carbamylene

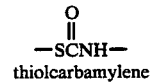
thiolcarbamylene

ureylene

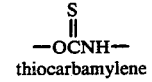
thiocarbamylene

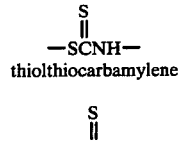
thiolthiocarbamylene

thioureylene

Radiation-reactive, ethylenically-unsaturated carbonylamino or thiocarbonylamino group-containing compounds (hereinafter alternatively collectively referred to as "carbonylamino compounds") particularly useful in this invention are polymerizable monomeric compounds or polymerizable oligomeric compounds having a molecular weight from about 230 to about 5000, preperably 500 to 2000, and containing up to about 120 repeating ester, oxyalkylene, or acrylic units. Such compounds can be prepared as the reaction product of an ethylenically-unsaturated isocyanate or isothiocyanate with a polymerizable monomeric compound or a polymerizable oligomeric nucleophilic polyhydroxy, polyamino, or polythiol compound having up to 120 repeating ester, oxyalkylene, or acrylic units, such as occur in polyester polyols, polyoxyalkylene polyols, polyoxyalkylene polyamines, polyoxyalkylene polythiols, and polyacrylic polyos.

The poly(vinyl chloride) resin compositions of the invention can be processed at low temperatures, e.g.

below about 180° C., to form shaped articles or coatings which can be cured by exposure to actinic radiation, such as ultraviolet, electron beam, and γ-ray, to form dimensionally stable, shaped articles, e.g. films, that are clear and that do not exude oily materials. These articles generally have significantly lower gel swell value and lower amounts of soluble material than those formed from poly(vinyl chloride) resin compositions that do not contain the carbonylamino compounds disclosed herein.

The resin compositions of this invention can optionally contain conventional plasticizers in addition to the carbonylamino or thiocarbonylamino group-containing compounds. A sufficient amount of the carbonylamino group-containing compound must be added to a poly (vinyl chloride) resin to form a composition so that, upon exposure of the composition to actinic radiation, a gel, i.e., an insoluble fraction is formed.

The poly(vinyl chloride) resin compositions of this invention preferably comprise:
(1) 75 to 100 percent by weight of a composition consisting of or consisting essentially of:
  (a) 100 parts by weight poly(vinyl chloride) resin,
  (b) 5 to 100 parts, preferably 20 to 60 parts, by weight of a radiation-reactive, ethylenically-unsaturated, carbonylamino or thiocarbonylamino group-containing compound which is compatible with said poly(vinyl chloride) resin,
  (c) 0 to 50 parts by weight of plasticizer, provided that there is no more than a total 100 parts by weight of said radiation-reactive compound and said plasticizer, and there is no more than one part of plasticizer per part of radiation-reactive compound, and
  (d) 0 to 10 parts by weight of a source of free radicals; and (2) 25 to 0 percent by weight of a reactive diluent monomer.

Poly(vinyl chloride) resins, hereinafter alternatively referred to as PVC resins, suitable for use in the low temperature-processable, radiation-curable compositions of this invention are well-known and are either homopolymers of vinyl chloride or copolymers of vinyl chloride with a minor portion by weight of one or more ethylenically-unsaturated comonomers copolymerizable with the vinyl chloride. Examples of these ethylenically-unsaturated comonomers include vinyl halides, such as vinyl fluoride and vinyl bromide; alpha-olefins, such as ethylene, propylene, and butylene; vinyl esters, such as vinyl acetate, vinyl propionate, vinyl butyrate, and vinyl hexanoate, or partially hydrolyzed products thereof, such as vinyl alcohol; vinyl ethers, such as methyl vinyl ether, propyl vinyl ether, and butyl vinyl ether; acrylic esters, such as methyl acrylate, ethyl acrylate, methyl methacrylate, and butyl methacrylate; and other monomers, such as acrylonitrile, vinylidene chloride, and dibutyl maleate. Such resins are generally known and many are commercially available. The most preferred poly(vinyl chloride, resin used in this invention is the homopolymer of vinyl chloride.

Examples of poly(vinyl chloride) resins that are useful in this invention and are commercially available include Geon ® 92 medium molecular weight, porous suspension poly(vinyl chloride) resin, Geon ® 128 high molecular weight dispersion grade poly(vinyll chloride) resin, both of which are manufactured by The B. F. Goodrich Co., and Diamond ® 450 medium molecular weight poly(vinyl chloride) resin, originally manufactured by Diamond Shamrock Corp., but now available as Geon ® 110X426 FG from The B. F. Goodrich Co. Other commercially available poly(vinyl chloride) resins of these types are equally suitable in the compositions of the invention.

As is well known, the PVC resins can be prepared by polymerization processes such as suspension, dispersion, emulsion, solution, and bulk polymerization; however, vinyl chloride polymers useful in the low-temperature-processable radiation curable compositions of this invention are most commonly prepared by suspension and dispersion techniques. Although the molecular weight of the vinyl chloride polymer may affect the processing conditions and final properties of the radiation cured composition, vinyl chloride polymers having a molecular weight of up to several thousand, e.g., 50,000 to 120,00, to several million or more are particularly suitable for the compositions of the invention.

The radiation-reactive, ethylenically-unsaturated carbonylamino or thiocarbonylamino group-containing compounds suitable for use in this invention must be "vinyl chloride resin-compatible". As used in this application, the term "vinyl chloride resin-compatible" means that a film of the poly(vinyl chloride) resin and about 10 percent by weight of the radiation-reactive, ethylenically-unsaturated compound, when pressed at elevated temperatures near the fusing point of the poly (vinyl chloride) resin composition or when cast from a solution of the mixture in a solvent (such as tetrahydrofuran) and the solvent evaporated, remains transparent i.e., the film does not become translucent or opaque when held at about 25° C. for at least 24 hours.

Preferred carbonylamino compounds useful in this invention can be represented by the general formula:

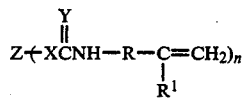   I wherein
Z represents the polyvalent aliphatic group which is the residue remaining after the removal of hydroxyl, amino, or thiol groups from a polymerizable monomeric or oligomeric nucleophilic compound, $Z(XH)_n$, Z containing carbon and hydrogen atoms, and optionally oxygen atoms, and having a molecular weight of 28 to 5000;
X represents —O—, —S—, or

in which $R^2$ is hydrogen or lower alkyl group, e.g., having one to six carbon atoms;
Y represents O or S;
R represents a radical selected from the group consisting of

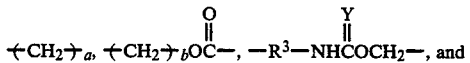, and

in which a is an integer from 1 to 6, b is an integer from 2 to 6, $R^3$ is an alkylene group, e.g., having 2 to 10 carbon atoms, a divalent carbocyclic aliphatic group with 5 or 6 ring members and having, for example, 5 to 10 carbon atoms, or an arylene group, e.g., having 6 to 14 carbon atoms, and Y is O or S; $R^1$ represents hydrogen or methyl group; and n is an integer having a value of 2 to 6.

More preferably, n is an integer having a value of 2 or 3.

When R is one of the above-mentioned radicals, it is to be understood that the group

i.e., the carbonylamino or thiocarbonylamino group, is indirectly connected to the ethylenically-unsaturated group.

The most preferred carbonylamino compounds for this invention are compounds of Formula I in which Z is the residue remaining after the removal of hydroxyl groups from polyester, polyoxyethylene, and polyacrylic polyols.

The radiation-reactive, carbonylamino compounds can be prepared by procedures well known in the art, such as by the reaction of one mole of nucleophilic compound, $Z(XH)_n$, with "n" mole equivalents of a monoisocyanato-substituted, radiation-reactive, ethylenically-unsaturated compound represented by the general formula:

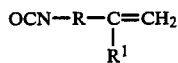

wherein R and $R^1$ are as defined above for Formula I. The reaction can be represented by the following equation:

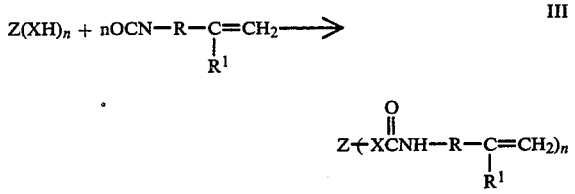

wherein Z, X, n, R and $R^1$ are as defined above for Formula I.

Monomeric nucleophilic compounds suitable for preparing the carbonylamino compounds useful in the radiation-curable vinyl chloride resin compositions of the invention can be selected from aliphatic polyhydric alcohols, aliphatic polyamines, and aliphatic polythiols, said aliphatic compounds preferably having up to 12 carbon atoms. Representative examples of the polyhydric alcohols are ethylene glycol, butanediol, 1,12-dodecandiol, glycerine, 1,1-dimethylol-propane, pentaerythritol, erythritol, arabitol, and sorbitol. Representative examples of the polyamines are ethylene diamine, butylenediamine, and 1,12-dodecanediamine. Representative examples of polythiols are 1,2-ethanedithiol, butanedithiol, and octanedithiol.

Oligomeric nucleophilic polyols suitable for preparing oligomeric carbonylamino compounds useful in this invention include any hydroxyl-terminated oligomeric compound having a number average molecular weight between about 500 and 5000 and a glass transition temperature ($T_g$) of less than 30° C. Representative examples of such oligomers include the hydroxyl-terminated polyesters described in U.S. Pat. Nos. 3,641,199 and 3,457,326, the hydroxyl-terminated lactone polyesters described in U.S. Pat. No. 3,169,945 (especially the polyester formed by reaction of epsilon-caprolactone and a polyol), the hydroxy-terminated block polymers of polyethers and polyesters described in U.S. Pat. No. 3,960,572, and the polyalkylene ether polyols described in U.S. Pat. Nos. 3,499,852, 3,697,485 and 3,711,444, all of which patents are incorporated herein by reference for their said descriptions of said compounds.

Commercially available oligomeric polyols suitable for preparing oligomeric carbonylamino compounds useful in this invention include the poly(oxypropylene) polyols sold by Union Carbide Corp. under the trademark NIAX ®, such as NIAX ® PPG 2000, a poly(oxypropylene)diol having a number average molecular weight of about 2000; the polycaprolactone polyols sold by Union Carbide Corp. under the trademark NIAX ® PCP, such as NIAX ® PCP 0230 and NIAX ® PCP 0240, which polyols have number average molecular weights of 1250 and 2000, respectively; the poly(oxytetramethylene) polyols sold by Wyandotte Chemicals Corp. under the trademark Polymeg ®, such as Polymeg ® 1000 and Polymeg ® 2000; and the poly(oxyethylene) polyols sold by Union Carbide Corp. under the trademark Carbowax ®, such as Carbowax ® 2000. The most preferred oligomeric polyols are the caprolactone polyols having a number average molecular weight of about 500 to about 2000.

Oligomeric nucleophilic polyamines suitable for preparing oligomeric carbonylamino compounds useful in the compositions of this invention include the polyoxyalkylene polyamines such as the polyoxyethylenediamines having a number average molecular weight of 500 to 3000, and the polyoxypropylenediamines having a number average molecular weight of 500 to 4000. Suitable commercially available oligomeric polyamines are the polyoxyethylenediamines of the "D" series and "ED" series of polyamines having the trademark Jeffamine ®, available from Jefferson Chemical Company.

Oligomeric nucleophilic polythiols suitable for preparing oligomeric carbonylamino compounds useful in this invention include polyoxyalkylene thiols, polyethylene glycol dimercaptoacetate, and polyethylene glycol dimercaptopropionate. Commercially available polyoxyalkylene thiols include LP-3 ® and LP-12 ®, which are mercapto-terminated polymers of bis(ethyleneoxy)methane having number average molecular weights of 1000 and 4000, respectively, both of which are available from Thiokol Corp.

Preferred monoisocyanato-substituted radiation-reactive compounds of Formula II for use in the reaction with the nucleophilic compounds for preparation of the ethylenically-unsaturated, radiation-reactive urethanes are the isocyanatoalkyl acrylates and isocyanatoalkyl methacrylates, such as 2-isocyanatoethyl acrylate, 2-isocyanato-ethyl methacrylate, 3-isocyanatopropyl acrylate, 3-isocyanatopropyl methacrylate, and 6-isocyanatohexyl acrylate. Other compounds of Formula II that are suitable for use in the reaction with the nucleophilic compound include, for example, olefinic isocyanate esters such as allyl isocyanate, methallyl isocyanate, and 3-butenyl isocyanate, and the adducts of one mole of an organic diisocyanate and one mole of an ethylenically-unsaturated, addition-polymerizable compound having a single isocyanate-reactive group. The isothiocyanatoalkyl acrylates and isothiocyanatoalkyl methacrylates, such as 2-isothiocyanatoethyl acrylate and 2-isothiocyanatoethyl methacrylate, which correspond to the isocyanatoalkyl acrylates and isocyanatoalkyl methacrylates can also be used for preparing the ethylenically-unsaturated compounds suitable for the present invention.

Preferred adducts of diisocyanates and ethylenically-unsaturated, addition-polymerizable compounds are those in which the latter compound is a hydroxyalkyl acrylate or hydroxyalkyl methacrylate. Such adducts can be prepared in accordance with the process described in U.S. Pat. No. 3,641,199. This process involves mixing together an organic diisocyanate and a hydroxyalkyl acrylate or hydroxyalkyl methacrylate and allowing them to react, heating the reaction mixture to from about 60° to 80° C. until the reaction is complete, as determined, for example, by -NCO content. Preferably, the reaction is accelerated by the use of a condensation catalyst such as stannous octoate.

Preferred ethylenically-unsaturated addition-polymerizable compounds for preparing the aforementioned adducts include 2-hydroxyethyl acrylate, 2-hydroxyethyl methacrylate, 2-hydroxypropyl acrylate, 2-hydroxypropyl methacrylate, N-hydroxymethyl acrylamide, N-hydroxymethyl methacrylamide, 2-(2-hydroxyethoxy)ethyl acrylate, glycerine diacrylate, trimethylolpropane diacrylate, pentaerythritol trimethacrylate, 3-chloro-2-hydroxypropyl acrylate, and 3-bromo-2-hydroxypropyl methacrylate.

Diisocyanates that can be used in preparing the adducts can be any organic diisocyanate having two free isocyanate groups, including aliphatic, cycloaliphatic, and aromatic diisocyanates. Mixtures of two or more diisocyanates can also be employed. Examples of suitable diisocyanates useful for preparing the adducts include tolylene-2,4-diisocyanate, 2,2,4-trimethyl-hexamethylene-1,6-diisocyanate, hexamethylene-1,6-diisocyanate, diphenylmethane-4,4-diisocyanate, m-phenylene diisocyanate, p-phenylene diisocyanate, tolylene-2,4-diisocyanate, naphthylene-1,5-diisocyanate, naphthylene-1,4-diisocyanate, diphenylene-4,4'-diisocyanate, 3,3'-bistolylene-4,4'-diisocyanate, 1,4-bis-(isocyanatomethyl)cyclohexane, xylylene-1,5-diisocyanate, xylylene-1,3-diisocyanate, cyclohexylene-1,4-diisocyanate, methylenebis(4-cyclohexylisocyanate), and 3,5,5-trimethyl-1-isocyanato-3-isocyanatomethyl-cyclohexane (also called isophorone diisocyanate). Isophorone diisocyanate, sold by Veba Chemie AG, and methylenebis(4-cyclohexylisocyanate), sold under the trademark Hylene ® by E. I. duPont de Nemours or under the trademark Desmodur ® W by Mobay Chemical Corporation, are especially preferred.

Other diisocyanates that can be employed are the isocyanate-terminated adducts of diols, such as ethylene glycol, 1,4-butylene glycol, and polyoxyalkylene glycols. These adducts can be formed by treating two moles of a diisocyanate, such as those mentioned previously, with one mole of a diol. Such polyfunctional isocyanates are well known in the art (see U.S. Pat. Nos. 3,073,802 and 3,054,755). Representative examples of commercially available isocyanate-terminated adducts of diols are sold under the trademarks Multrathane ®, by Mobay Chemical Corp. and Adiprene ® by E. I. duPont de Nemours.

Diisothiocyanates that can be used for preparing the adducts can be any of the diisothiocyanates corresponding to the diisocyanates discussed previously. Representative examples of diisothiocyanates that can be used include tolylene-2,4-diisothiocyanate, hexamethylene-1,6-diisothioocyanate, and methylene bis(4-cyclohexylisothiocyanate).

To promote the reaction of the polyols, polyamines, and polythiols with the isocyanates in forming the oligomers, it is desirable to utilize a catalyst. Typical of catalysts useful for promoting the reaction include compounds containing tertiary amino groups, and tin compounds.

Representative examples of the tin catalysts include dibutyltin dilaurate, dibutyltin diethylhexoate, dibutyltin sulfide, dibutyltin dibutoxide, stannous octoate, stannous oleate, and stannous chloride. Concentrations of catalyst from about 0.01 to about 0.5 weight percent, and preferably from about 0.025 to 0.1 weight percent, based on the total weight of reactants, exclusive of solvents, can be used.

The radiation-curable poly(vinyl chloride) resin compositions of the invention can optionally contain plasticizers for poly(vinyl chloride) resins. When plasticizers are used, up to about 50% by weight of the radiation-reactive vinyl carbonylamino compounds can be replaced. Plasticizers suitable for use in the compositions of this invention include non-reactive plasticizers, such as the esters of alcohols with mono- or dicarboxylic aliphatic and aromatic acids, and epoxidized natural oils. Representative examples of these plasticizers are esters of phthalic acid, adipic acid, sebacic acid, azelaic acid, glycolic acid, ricinoleic acid, citric acid, benzoic acid, phosphoric acid, succinic acid; phosphates; and epoxy derivatives. Other plasticizers suitable for use in this invention include reactive plasticizers such as the ethylenically-unsaturated esters disclosed in U.S. Pat. No. 3,700,624. Representative examples of these plasticizers are 1,4-butanediol dimethacrylate, triethylene glycol diacrylate, diallyl phthalate, and triallyl phosphate. The amount of plasticizer and ethylenically-unsaturated vinyl carbonylamino compound to be used depends upon the properties required for the particular article being prepared. Preferred commercially available, plasticizers are the non-branched alcohol esters of aliphatic dicarboxylic acids such as the polyester plasticizer Santicizer ® 429, available from Monsanto Company. Other plasticizers which can be used are exemplified by the polyepoxybutadienes sold by Viking Chemical Co.

Reactive diluent monomers can also be incorporated into the radiation-curable poly(vinyl chloride) resin composition to contribute to the flexibility, or stiffening, of the total cured composition. Generally, up to about 25 percent by weight of the total composition can comprise reactive diluent monomers. Monomers whose homopolymers have a glass transition temperature (Tg) of less than about 350° K. add flexibility, and monomers whose homopolymers have a Tg higher than about 350° K. add stiffness to the cured composition. Reactive diluent monomers that are useful for this invention are ethylenically-unsaturated monomers. These ethylenically-unsaturated monomers and the glass transition temperature of their homopolymers are well known in polymer chemistry [see Brandrup and Immergut, *Polymer Handbook*, Chapter III, Wiley Interscience Publishers, New York (1967), pp. 61–73] and include isoboronyl acrylate (367° K.), methyl methacrylate (378° K.), 2,4- dichlorostyrene (406° K.), styrene (373° K.), acrylic acid (360° K.), acrylamide, acrylonitrile (393° K.), butyl acrylate (218° K.), ethyl acrylate (249° K.), 2-ethylhexyl acrylate (203° K.), dodecyl methacrylate (208° K.), and 4-decylstyrene (208° K.), 4-cyclohexyl-1-butene (318° K.), 1-dodecene (267° K.), t-butyl acrylate (251° K.), cyclohexyl acrylate, dodecyl acrylate (270° K.), isopropyl acrylate (270° K.), methyl acrylate (279° K.), butyl methacrylate (293° K.) 4-butoxystyrene (320° K.), 2-(N-butylcarbamyl)ethylmethacrylate (304° K.) and 2-(N-ethylcarbamyl)ethyl methacrylate (303° K.). Polyethylenically-unsaturated monomers can also be used; they increase the crosslink density of the composition by reducing the molecular weight of the cured composition per crosslink. Representative examples of polyethylenically-unsaturated monomers useful in this invention are 1,5-butylene dimethacrylate and 1,5-butylene diacrylate, ethylene dimethacrylate and ethylene diacrylate, trimethylolpropane dimethacrylate and trimethylopropane diacrylate, glyceryl diacrylate and glyceryl dimethacrylate, glyceryl triacrylate and glyceryl trimethacrylate, glycidyl acrylate and glycidyl methacrylate, pentaerythritol triacrylate and pentaerythritol trimethacrylate, diallyl phthalate, 2,2-bis(5-methacryloxyphenyl)propane, diallyl adipate di-(2-acryloxyethyl)ether, dipentaerythritol pentaacrylate, neopentylglycol triacrylate, polypropylene glycol diacrylate or dimethacrylate, and 1,3,5-tri(2-methacryloxyethyl)-n-triazine.

Other ingredients can also be used in conjunction with the plasticizers and reactive diluent monomers in formulating the compositions of the invention. Stabilizers can be used to protect the cured composition from degradation by heat and light. Stabilizers suitable for this purpose include the alkyl aryl phosphates and 4,4'-butylidene-bis(6-t-butyl-m-cresol). Additional ingredients which can be optionally incorporated into the compositions of this invention include lubricants, such as the fatty acids, their salts and esters; colorants, such as dyes and pigments; fillers, such as fumed silica, alumina, carbon black, natural and synthetic resins in particulate, flake or fibrous form; foaming agents, such as the low boiling hydrocarbons and halocarbons; wetting agents, such as the non-ionic surface-active agents; flame retardants; anti-static agents; thickening agents, such as sodium silicate, calcium silicate, talc; and coupling agents, such as the hydrolyzable silanes to improve bonding of fillers to the resin. Amounts up to about 100% by weight of the aforementioned additives, based on the weight of the total composition, exclusive of any solvent, can be added.

The radiation-curable poly(vinyl chloride) resin compositions of this invention can be prepared by mixing techniques well known in the art. The components can be combined by any conventional technique to form dry blends, plastisols, organosols, solutions, or the like. The combined components can then be extruded, cast and fused, or coated from solution, depending upon the form in which they are combined. The shaped composition can then be cured by their exposure to actinic radiation, e.g., ultraviolet, electron beam, and gamma radiation. Generally, the use of from 0.5 to 10 megarads of radiation is sufficient to provide cure to a final product.

When the curing radiation is particle radiation, e.g., gamma rays, x-rays, alpha and beta particles from radioisotopes, electron beams, and the like, no additional source of free radicals for initiating polymerization is required. When the curing energy is ultraviolet, it is necessary to add a source of free radicals to the composition to initiate reaction on application of curing energy. Included among free radical sources or initiators that are suitable for the compositions of this invention are conventional thermally activated compounds such as organic peroxides and organic hydroperoxides. Representative examples of these are benzoyl peroxide, tertiary-butyl perbenzoate, cumene hydroperoxide, and azobis(isobutyronitrile). The preferred initiators are photopolymerization initiators which facilitate polymerization when the composition is irradiated. Included among these initiators are acyloin and derivatives thereof, e.g., benzoin, benzoin methyl ether, benzoin ethyl ether, benzoin isopropyl ether, benzoin isobutyl ether, and α-methylbenzoin, diketones, e.g., benzil and diacetyl, organic sulfides, e.g., diphenyl monosulfide, diphenyl disulfide, decyl phenyl sulfide, and tetramethylthiuram monosulfide, S-acyl dithiocarbamates, e.g., S-benzoyl-N,N-dimethyldithiocarbamate, phenones, e.g. acetophenone, α, α, α-tribromacetophenone, α, α-diethoxy acetophenone, o-nitro-α, α, α-tribromoacetophenone, benzophenone, and p,p'-tetramethyldiaminobenzophenone. The initiator can be used in amounts ranging from about 0.01 to 5% by weight of the total polymerizable composition. When the amount is less than 0.01% by weight, the polymerization rate will generally be too low. If the amount exceeds about 5% by weight, no correspondingly improved effect can be expected. Preferably, about 0.05 to 1.0% by weight of initiator is used in the polymerizable compositions.

The cured poly(vinyl chloride) resin compositions of the invention are useful in the form of such shaped articles as self-supporting films, foils, and sheets and as coatings. The compositions of this invention are particularly useful as a sheet for a tape support for an adhesive, such as, for example, a pressure sensitive or hot melt adhesive, and as coating compositions for substrates such as wire and flat cable insulation where conductor-to-conductor dimensional stability is critical and where cable constructions are subjected to strong solvents and heat. Flat cable can be described as a plurality of wires encased in a polymeric insulating cover. Other uses for the cured compositions include electrical tape backings where toughness and resistance to solvents are required, and decorative and protective tape where dimensional stability and solvent resistance are required.

Preparations A–K, which will be described below, are typical of carbonylamino group-containing compounds included within the scope of formula I that may be mixed with poly(vinyl chloride) resin to derive the compositions of the present invention. All parts are in parts by weight unless otherwise indicated.

Preparation A

Preparation of a radiation-reactive methacrylate-functional poly(neopentylglycol adipate)urethane oligomer Into a glass-lined reactor equipped with a mechanical stirrer, a dry air sparge tube, and a thermometer were charged 17.6 parts (0.16 equivalent) isophorone diisocyanate (—NCO equivalent weight 110) and 0.05% by weight (based on the weight of the entire charge) dibutyltin dilaurate.

In a separate vessel, to 37.4 parts (0.04 equivalent) of poly(neopentylglycol adipate)diol (available from Inolex Corp. under the trademark Lexorez ® 1400-60) was added a mixture of 8.6 parts (0.065 equivalent) 2-hydroxyethyl methacrylate (HEMA) and 0.2% by weight (based on the weight of the entire charge) tetrakis [3,5-di(t-butyl-4-hydroxyphenyl)propionyloxymethyl]methane (available from Ciba-Geigy Corp. under the trademark Irganox ® 1010). The resulting mixture was then added slowly to the stirred isocyanate/dibutyltin dilaurate catalyst mixture in the reactor. The temperature was maintained below 65° C. during the addition. After the mixture had been stirred for four hours, the —NCO number was measured and found to be 4900 (theoretical 4500). At this point, 2.1 parts (0.016 equivalent) of HEMA was added, and the mixture allowed to react at 60° C. for 16 hours. After this period, infrared analysis revealed no residual isocyanate in the oligomeric product. The oligomeric product can be represented by the following formula:

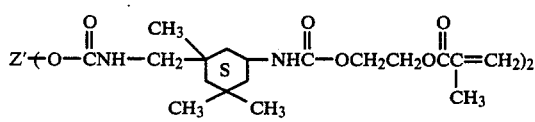

wherein Z' represents the residue remaining after the removal of hydroxyl groups from poly (neopentylglycol adipate)diol.

This product is included within the scope of Formula I.

Preparation B

Preparation of a methacrylate-functional polyacrylic urethane oligomer

A mixture of 137 grams of a product comprising a hydroxy-functional acrylic polymer (80 parts) and hexane diol diacrylate (20 parts), said product having a hydroxyl equivalent weight of 609 (available from General Mills, Inc. under the trademark TSAX ® 1073), 16.3 grams of 2-isocyanatoethyl methacrylate, and 10 drops of dibutyltin dilaurate were stirred for 2 hours in a 500 ml round-bottomed flask. Inspection of the infrared spectrum of the oligomeric product indicated the absence of —NCO functionality.

Preparation C

Preparation of a trimethacrylate-functional polyester urethane oligomer

A trihydroxy-functional polyester (94.4 grams) having a hydroxyl equivalent weight of 177 (available from Union Carbide Corp. under the trademark NIAX ® PCP-0300) containing 5 drops of dibutyltin dilaurate was reacted by means of a procedure similar to that employed in Preparation B, with 380 grams (3.33 equivalents) γ-caprolactone containing 9 drops of dibutyltin dilaurate to yield a chain extended triol having a hydroxyl equivalent weight of 382.

By a procedure similar to that employed in Preparation B, 76.4 grams (0.2 equivalent) of the triol formed in the preceding step was treated with 31.7 grams 2-isocyanatoethyl methacrylate and 15 drops of dibutyltin dilaurate. Following ice-bath cooling until the initial exotherm had subsided, the mixture was stirred for about 3 hours, after which time the —NCO functionality as determined by infrared analysis had disappeared from the oligomeric product.

Preparation D

Preparation of a diacrylate-functional polyester oligomer (non-urethane)

A polyester diol [51.9 grams (0.14 equivalent)] having an —OH equivalent weight of 372 (available from Union Carbide Corp. under the trademark NIAX ® PCP-0210), 12.2 grams of acryloyl chloride, 0.026 gram of phenothiazine, and 50 ml of dichloromethane were placed in a 250 ml round-bottomed flask, fitted with mechanical stirrer, thermometer, and addition funnel equipped with a drying tube. Triethylamine (13.7 grams) was added to the flask dropwise while the mixture was maintained at a temperature of 30° to 40° C. by means of ice-bath cooling. Following the amine addition, the reaction mixture was heated at 50° C. for one hour. After being allowed to cool to room temperature, the mixture was diluted with 300 ml of dichloromethane and filtered to remove the triethylamine hydrochloride salt. The solution was then washed successively with a 5% aqueous sodium carbonate solution and a 5% aqueous sodium chloride solution, and dried over magnesium sulfate (anhydrous) overnight. After filtration and removal of the solvent by evaporation, the crude product was passed through a silica gel column to remove colored impurities from the oligomeric product.

Preparation E

Preparation of a dimethacrylate-functional urethane containing polyester oligomer A polycaprolactone diol [41.7 grams (0.1 equivalent)] having an hydroxyl equivalent weight of 417 (available from Union Carbide Corp. under the trademark NIAX ® PCP-0210), 15.5 grams (0.11 equivalent) of 2-isocyanatoethyl methacrylate, and 8 drops of dibutyltin dilaurate were mixed in a 250 ml 3-necked flask. After ice bath cooling until the initial exotherm had subsided, the mixture was stirred for an additional hour while the temperature was maintained below about 45° C. After this period had elapsed, the —NCO functionality as determined by infrared analysis had disappeared from the oligomeric product.

Preparation F

Preparation of a dimethacrylate-functional polyether urethane oligomer

To 139.5 grams (0.8 mol) of 2,4-toluene diisocyanate in a 1 liter round-bottomed flask was added 400 grams (0.8 equivalent) of a poly(oxypropylene)diol having an equivalent weight of 500 (available from Union Carbide Corp. under the trademark NIAX ® PPG 1025) over a period of about 1 hour while the temperature was maintained below about 55° C. Then 115.3 grams of 2-hydroxyethyl methacrylate was then added to the reaction mixture. After an additional two hours, the reaction was complete as determined by infrared analysis of the oligomeric product.

Preparation G

Preparation of a dimethacrylate-functional polyester urethane oligomer

To 260 grams of methylene bis(4-cyclohexylisocyanate) having an —NCO equivalent weight 131 (manufactured by E. I. duPont de Nemours under the trademark Hylene ® WS) in a 1 liter round-bottomed flask, were added 0.1 gram dibutyltin dilaurate and 453.2 grams polycaprolactone diol having an —OH equivalent weight 415 (available from Union Carbide Corp. under the trademark NIAX ® PCP-0210). A temperature of 65° to 70° C. was maintained until the —NCO equivalent weight had reached 796, indicating essentially complete reaction of the diisocyanate with the diol. Then 143 grams of 2-hydroxyethyl methacrylate was added to the reaction mixture, and the reaction was allowed to proceed for an additional 14 hours. At that time infrared analysis of the oligomeric product indicated the reaction was complete.

Preparation H

Preparation of a dimethacrylate-functional polyether urethane oligomer

To 2 mols of 2,4-toluene diisocyanate in a 2 liter flask was added one mol of poly(tetramethyleneoxide)diol having a hydroxyl equivalent weight of 443 (available from Quaker Oats Co. under the trademark Polymeg ® 1000) over a period of about 1 hour while the temperature was maintained below about 55° C. Two mols of 2-hydroxyethyl methacrylate were then added to the reaction mixture. After 2 hours, the reaction was complete and the oligomeric product recovered.

Preparation I

Preparation of a dimethacrylate-functional polyether urethane oligomer

To 0.5 mol of 2,4-toluene diisocyanate in a 500 ml round-bottomed flask was added 0.25 mol (0.5 equivalent) of polyoxyethylene glycol having a hydroxyl equivalent weight of 271 (available from Union Carbide Corp. under the trademark Carbowax ® 600) over a period of about 1 hour while the temperature was then maintained below about 55° C. 2-Hydroxyethyl methacrylate (0.5 mol) was then added to the reaction mixture. After 2 hours the reaction was complete and the oligomeric product recovered.

Preparation J

Preparation of a hexaacrylate-functional polyether urethane oligomer

To 18.1 grams (0.04 equivalent) of a toluene diisocyanate (TDI) functional poly(tetramethyleneoxide)diol (available from E. I. duPont de Nemours under the trademark Adiprene ® L-315), mixed with 14.2 grams (0.05 equivalent) of pentaerythritol triacrylate having an —OH equivalent weight 354 in a 100 ml round-bottomed flask was added 8 drops of dibutyltin dilaurate. The reaction mixture was heated to 55° C. for about 2.5 hours at which point the reaction was complete as determined by infrared analysis of the oligomeric product.

Preparation K

Preparation of a dimethacrylate-functional polyester urethane oligomer

To 60.1 grams of a neopentyl glycol/adipic acid polyester diol having an —OH equivalent weight 601 (available from Inolex Corp. under the trademark Lexorez ® 1400-90) mixed with 15.6 grams of 2-isocyanatoethyl methacrylate in a 250 ml round-bottomed flask was added 8 drops of dibutyltin dilaurate. After ice-bath cooling until the initial exotherm had subsided, the mixture was stirred for an additional hour while the temperature was maintained below about 45° C. The reaction was complete in about one hour as determined by infrared analysis, and the oligomeric product recovered.

Examples of Preparation of the Radiation-Curable Compositions of the Invention A stock solution containing poly(vinyl chloride) resin and various additives such as heat stabilizers and ultraviolet stabilizers was prepared by combining the ingredients as shown below.

| Ingredient | Parts | Weight (g) |
|---|---|---|
| Poly(vinyl chloride) resin (Diamond ® 450 - Diamond Shamrock Corp.) | 100 | 360 |
| Heat stabilizer (Thermolite ® 42 - M & T Chemicals Inc.) | 5 | 18 |
| Ultraviolet stabilizer (Uvinul ® N-539 - GAF Corp.) | 5 | 18 |
| Antioxidant (Irganox ® 1010 - Ciba-Geigy Corp.) | — | 0.8 |
| Tetrahydrofuran | — | 1908.0 |

The above ingredients were placed in a 3-liter flask was fitted with mechanical stirrer, condenser fitted with bubbler, and air inlet tube. The mixture was stirred overnight with gentle air flow at 65° C. oil bath temperature. During this period, a homogeneous solution was formed. To portions of this solution were added various radiation curable carbonylamino group-containing compounds prepared as described above as indicated in the following examples.

EXAMPLE 1

A radiation-curable solution containing the stock poly(vinyl chloride) composition was prepared by combining 7.2 grams of the methacrylate-functional poly(neopentylglycol adipate)urethane oligomer of Preparation A with 76.8 grams of the stock solution and shaking the mixture until a homogenous mixture had formed. A solution having 60 parts of oligomer per 100 parts (60 phr) of poly(vinyl chloride) was obtained.

Onto nascent 15 cm wide polyethylene terephthalate film having a thickness of 35 micrometers was applied, by knife coating, using a 350 micrometer ($\mu$m) orifice, a layer of the above solution. The coated layer was allowed to air dry for 24 hours to allow the tetrahydrofuran to evaporate, after which time 30 cm long samples were cut and exposed to electron beam radiation. Film samples were cured under the following conditions:

| Sample No. | Accelerating voltage (KeV) | Beam current (milliamps) | Radiation dose (MRad) |
|---|---|---|---|
| 1 | — | — | 0 |
| 2 | 200 | 0.39 | 0.5 |
| 3 | 200 | 1.56 | 2.0 |
| 4 | 200 | 3.90 | 5.0 |
| 5 | 200 | 7.81 | 10.0 |

Samples 2–5 were exposed at a web speed of 7.6 meters/minute under a nitrogen atmosphere (100–300 ppm $O_2$). The samples were then evaluated by the following tests and the results obtained presented in Table I.

The following analytical testing procedures were used to evaluate selected chemical and physical properties of the control sample and cured film samples.

A. Tensile Strength—ASTM D882

This test provides a means for evaluating the effect of radiation and compositional variation on the strength of films.

B. Percent Elongation—ASTM D882

This test provides an indication of the relative level of plasticization of control sample versus irradiated samples.

C. Percent Gel Swell

This test provides an indication of the relative extent of cross-linking of the irradiated samples, said cross-linking being a function of radiation dose. Percent gel swell is determined as follows:
(1) A sample of the film is weighed;
(2) The sample is immersed in a solvent (½ g of sample in 50 ml of tetrahydrofuran);
(3) The sample is allowed to soak 24 hours, whereupon the soluble portion dissolves and the cross-linked portion swells;
(4) The swelled portion is removed, drained, and weighed before the solvent evaporates;
(5) % gel swell is calculated from the formula:

$$\% \text{ Gel Swell} = 100 \times \frac{\text{Mass of gelled polymer plus Mass of Solvent entrained}}{\text{Mass of gelled polymer}}$$

(6) As the degree of cross-linking increases, the % gel swell decreases.

D. Percent Insolubles

This test measures the fraction of insoluble material in the irradiated samples and is directly related to the solvent resistance of the film samples.

E. Dynamic Mechanical Analysis ($T_{dmax}$ by DMA)

This test measures the temperature of maximum mechanical energy damping. Samples are cooled to $-100°$ C. and temperature raised 5° per minute in a 981 Dynamic Mechanical Analyzer (DuPont Instruments Co., a division of E. I. DuPont de Nemours) to obtain resident frequency and dissipation from which $T_{dmax}$ is calculated. $T_{dmax}$ is related directly to the glass transition temperature of a sample.

TABLE I

| Sample No. | Electron beam radiation dose (Mrads) | Tensile strength (kg/cm$^2$) | Elongation (%) | Insolubles (%) | Gel swell (%) | $T_{dmax}$ by DMA (°C.) |
|---|---|---|---|---|---|---|
| 1 | 0 | 245 | 190 | 0 | — | 35 |
| 2 | 0.5 | 270 | 160 | 21.1 | 4060 | — |
| 3 | 2.0 | 370 | 145 | 51.1 | 1670 | — |
| 4 | 5.0 | 360 | 140 | 69.5 | 1320 | 62 |
| 5 | 10.0 | 340 | 130 | 79.5 | 1060 | — |

The above data show that with increasing radiation, tensile strength increases to a maximum between about 2 and 5 Mrads. Elongation decreases, percent insolubles increases, and percent gel swell decreases, as are expected with increasing doses of radiation. Increased radiation leads to increased grafting/cross-linking, which further leads to increased molecular weight. The changes resulting from increased radiation dosage bring about greater solvent resistance, greater heat stability, and greater dimensional stability. Irradiated samples remained clear and unblushed after more than three months.

EXAMPLE 2

Radiation-curable poly(vinylchloride) resin compositions were prepared as described above in Example 1, utilizing in place of the oligomer of Preparation A, the oligomers of Preparations B-I. Films of each composition were cast and cured as described in Example 1. Physical properties of the cured films are presented in TABLE II.

TABLE II

| Oligomer (Preparation Number) | Electron beam dose (Mrads) | Tensile strength[a] (psi) | (kg/cm$^2$) | Elongation[a] (%) | Insolubles[b] (%) | Gel swell[b] (%) | $T_{dmax}$ by DMA[c] (°C.) |
|---|---|---|---|---|---|---|---|
| B | 0 | 2880 | 200 | 220 | 0 | — | — |
|   | 0.5 | 4980 | 350 | 110 | 36.8 | 1420 | — |
|   | 2 | 6240 | 440 | 95 | 53.5 | 990 | — |
|   | 5 | 6915 | 485 | 90 | 71.5 | 550 | — |
|   | 10 | 7340 | 515 | 75 | 81.3 | 480 | — |
| C | 0 | 3430 | 240 | 280 | 0 | — | — |
|   | 0.5 | 5710 | 400 | 90 | 42.0 | 890 | — |
|   | 2 | 7485 | 525 | 95 | 64.8 | 500 | — |
|   | 5 | 6600 | 465 | 80 | 78.3 | 530 | — |
|   | 10 | 6380 | 450 | 70 | 84.8 | 320 | — |
| D | 0 | 2415 | 170 | 315 | 0 | —? | — |
|   | 0.5 | 2440 | 170 | 160 | 28.6 | 1910 | — |
|   | 2 | 4480 | 315 | 95 | 62.0 | 570 | — |
|   | 5 | 5045 | 355 | 90 | 79.3 | 480 | — |
|   | 10 | 4320 | 305 | 80 | 86.0 | 440 | — |
| E | 0 | 3495 | 245 | 310 | 0 | — | — |
|   | 0.5 | — | — | — | — | — | — |
|   | 2 | 5915 | 415 | 100 | 63.6 | 500 | — |
|   | 5 | 4720 | 330 | 80 | 76.4 | 510 | — |
|   | 10 | 5245 | 370 | 95 | 84.0 | 460 | — |
| F | 0 | 3715 | 260 | 240 | 0 | — | 20,62 |
|   | 0.5 | 3820 | 270 | 220 | 3.1 | 9140 | — |
|   | 2 | 4010 | 280 | 135 | 39.7 | 2500 | — |
|   | 5 | 4705 | 330 | 145 | 60.2 | 1420 | 67 |
|   | 10 | 5220 | 365 | 95 | 79.0 | 1120 | — |
| G | 0 | 3155 | 220 | 115 | 0 | — | 38 |
|   | 0.5 | — | — | — | 21.3 | 3470 | — |

TABLE II-continued

| Oligomer (Preparation Number) | Electron beam dose (Mrads) | Tensile strength[a] | | Elongation[a] (%) | Insolubles[b] (%) | Gel swell[b] (%) | $T_{dmax}$ by DMA[c] (°C.) |
|---|---|---|---|---|---|---|---|
| | | psi | kg/cm² | | | | |
| | 2 | 5550 | 390 | 110 | 52.5 | 1360 | — |
| | 5 | 5590 | 390 | 110 | 72.3 | 1050 | 65 |
| | 10 | 5210 | 365 | 105 | 83.5 | 880 | — |
| H | 0 | 3350 | 235 | 265 | 0 | — | 27,33 |
| | 0.5 | — | — | — | 19.2 | 4220 | — |
| | 2 | 5370 | 375 | 110 | 49.6 | 1100 | — |
| | 5 | 5600 | 395 | 110 | 70.2 | 790 | 65 |
| | 10 | 5585 | 390 | 95 | 83.0 | 710 | — |
| I | 0 | 3895 | 270 | 195 | 0 | — | −10,68 |
| | 0.5 | 3935 | 275 | 95 | 14.1 | 4110 | — |
| | 2 | 5285 | 370 | 45 | 33.0 | 2160 | — |
| | 5 | 5585 | 390 | 55 | 53.5 | 1800 | 69 |
| | 10 | 5205 | 365 | 40 | 69.9 | 1340 | — |

[a]Values are the average of 10 runs/sample.
[b]Extractions were run 24 hr. at room temperature in tetrahydrofuran.
[c]Control samples set for 3 months at room temperature (20-25° C.) prior to DMA testing. All electron beam cured films were cured within 24 hr. of preparation.

From the tabulated data, it is apparent that increasing the dose of radiation, which increases grafting/cross-linking and molecular weight, decreases elongation and percent gel swell, and increases percent insolubles. As in Example 1, increasing radiation dosage results in greater solvent resistance, greater heat stability, and greater dimensional stability.

EXAMPLE 3

Example 1 was repeated using the oligomers of Preparations J and K in place of the oligomers of Preparations A–I. Tough, transparent films were obtained from which the oligomer did not exude on storage for at least 6 months.

EXAMPLE 4

Example 1 was repeated using acrylic functional derivatives of polyether polyols in place of the oligomers of Preparations A–I. A polyoxyethylene diol having a molecular weight of 400 (Carbowax ® 400), a polyoxypropylene diol having a molecular weight of 425 (NIAX ® PPG 425), a poly(oxytetramethylene)diol having a molecular weight of 1000 (Polymeg ® 1000), and a tetraol (Pluracol ® PeP-650) were the acrylic functional derivatives of polyether polyols tested. The cured films obtained were cloudy and exuded an oily material.

EXAMPLE 5

A radiation curable poly(vinyl chloride) resin composition was prepared from the following ingredients:

| Ingredient | Parts | Weight (g) |
|---|---|---|
| Poly(vinyl chloride) resin (Geon ® 128 - The B. F. Goodrich Co.) | 100 | 1575 |
| Carbonylamino group-containing compound (from Preparation G) | 36 | 567 |
| 2-Hydroxyethyl methacrylate (Rohm and Haas Co.) | 24 | 378 |
| Conventional polyester plasticizer (Santicizer ® 429 - Monsanto Company) | 40 | 360 |
| Heat stabilizer (Thermolite ® 42 - M & T Chemicals Inc.) | 1 | 15.8 |
| Heat stabilizer (Thermolite ® 31 Super, M & T Chemicals Inc.) | 4 | 63 |
| Heat stabilizer/antioxidant (p-methoxy phenol) | 0.03 | 0.47 |
| Photoinitiator | 1.0 | 15.8 |

-continued

| Ingredient | Parts | Weight (g) |
|---|---|---|
| (Vicure ® 30 - Stauffer Chemical Company) | | |

The ingredients were combined by first blending all of them, except the poly(vinyl chloride) resin, into a homogeneous mixture using a high speed mixer (Barrington), and then slowly adding the PVC, while maintaining the temperature below 60° C. The composition obtained was 3-roll milled to a 4.5 to 6 grind (on the Paint Club Scale), knife coated at 305 cm/min onto a paper based release liner, and heated at about 180° C. for about one minute in a forced air oven. A 60μm thick, clear, fused film was obtained. Physical characteristics of samples of the film cured by electron beam (EB) or ultraviolet (UV) radiation are set forth in Table III.

TABLE III

Properties of Radiation Cured PVC/Preparation G Compositions

| Sample No. | Method of cure | Radiation dose[a] | Tensile strength (kg/cm²)[b] | Elongation (%) | Insolubles[b] (%) | Gel swell (%) |
|---|---|---|---|---|---|---|
| 1 | EB | 0.25 | 280 | 350 | 20.1 | 3200 |
| 2 | EB | 0.5 | 290 | 215 | 30.5 | 2400 |
| 3 | EB | 0.75 | 320 | 230 | 36.7 | 2200 |
| 4 | EB | 1.0 | 310 | 210 | 40.4 | 2100 |
| 5 | EB | 1.25 | 325 | 215 | 44.4 | 1800 |
| 6 | EB | 3.0 | 330 | 210 | 58.0 | 1700 |
| 7 | EB | 4.0 | 340 | 210 | 61.7 | 1900 |
| 8 | UV | 1/15.2/40 | 270 | 280 | 10.1 | 6500 |
| 9 | UV | 1/15.2/80 | 290 | 270 | 14.8 | 5500 |
| 10 | UV | 1/15.2/120 | 280 | 255 | 17.6 | 6300 |
| 11 | UV | 1/7.6/40 | 300 | 260 | 18.4 | 4000 |
| 12 | UV | 1/7.6/80 | 310 | 260 | 21.7 | 3400 |
| 13 | UV | 1/7.6/120 | 285 | 230 | 24.3 | 3000 |
| 14 | UV | 2/7.6/80 | 320 | 230 | 27.8 | 2700 |

[a]Electron Beam (EB) dose was in MRads; Ultraviolet (UV) dose was as follows: number of passes/rate in meters per minute/watts per centimeter per lamp (2 lamps used).
[b]Insolubles were determined by extraction of irradiated samples for 48 hours by tetrahydrofuran at 25° C. followed by drying of the residue under the vacuum of a water aspirator for 16 days.

From the results of Table III, it can be concluded that curing by means of electron beam provides a higher degree of cross-linking than does curing by means of ultraviolet radiation.

EXAMPLE 6

Two series of films of this invention were prepared in order to compare (a) the characteristics of poly(vinyl chloride) compositions that do not contain a carbonylamino group-containing compound with (b) the characteristics of poly(vinyl chloride) resin compositions that contain a carbonylamino group-containing compound in accordance with the invention. The first series of films was prepared by adding 0.02, 0.04, 0.06 and 0.08 gram mol of Compound IV,

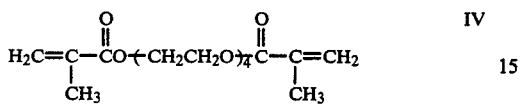

to 630 grams of a tetrahydrofuran solution containing 100 grams of poly(vinyl chloride) and 0.0449 gram of Irganox ® 1010 antioxidant, knife coating the solution at a wet thickness of 325 μm onto unprimed polyester, air drying for 48 hours, and exposing each film to electron beam under 150 to 200 ppm of oxygen at 200 KeV and 1, 3 and 5 MRads. Compound IV is commercially available from the Sartomer division of Atlantic Richfield Co. under the trade designation SR 209. The second series of films was prepared in the same manner, but using a carbonylamino group-containing compound in accordance with the present invention, Compound V, instead of the dimethacrylate of Compound IV,

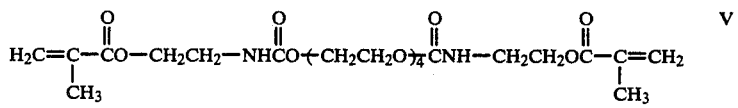

This compound was prepared by introducing into a 100 ml flask, fitted with dry air tube and mechanical stirrer, 18.5 g (0.095 mol) tetraethyleneglycol, 31.5 g (0.230 mol) isocyanoethylmethacrylate, 0.018 g Irganox ® 1010 antioxidant (Ciba-Geigy Corp.) dissolved in tetrahydrofuran, then adding 7 drops of dibutyltin dilaurate to the flask, and allowing the reaction to proceed. The reaction mixture was maintained below 30° C., and the reaction was complete by the end of 45 minutes.

Samples of each of the cured films were used to measure gel swell, percent insolubles, tensile strength and elongation. The results are set forth in Table IV.

TABLE IV

Comparison of Electron Beam Cured Films Containing Compounds IV and V

| Sample No. | Cross-linking compound (gram-moles)[a] | Electron beam exposure (MRad) | Gel swell[b] (%) | Insolubles[b] (%) | Tensile strength[c] (kg/cm²) | Elongation[c] (%) |
|---|---|---|---|---|---|---|
| 1 | IV (0.02) | 1 | soluble | | 200 | 200 |
| 2 | | 3 | soluble | | 210 | 160 |
| 3 | | 5 | soluble | | 190 | 165 |
| 4 | V (0.02) | 1 | soluble | | 220 | 210 |
| 5 | | 3 | 7650 | 22.6 | 230 | 165 |
| 6 | | 5 | 6050 | 30.7 | 180 | 160 |
| 7 | IV (0.04) | 1 | 7850 | 17.6 | — | — |
| 8 | | 3 | 5200 | 32.2 | — | — |
| 9 | | 5 | 3700 | 41.3 | — | — |
| 10 | V (0.04) | 1 | 2800 | 28.5 | — | — |
| 11 | | 3 | 1900 | 51.6 | — | — |
| 12 | | 5 | 1950 | 63.1 | — | — |
| 13 | IV (0.06) | 1 | 4050 | 31.3 | 230 | 200 |
| 14 | | 3 | 2300 | 51.3 | 265 | 120 |
| 15 | | 5 | 1850 | 63.1 | 310 | 110 |
| 16 | V (0.06) | 1 | 2700 | 31.7 | 260 | 170 |
| 17 | | 3 | 1450 | 54.1 | 300 | 125 |
| 18 | | 5 | 1450 | 65.6 | 325 | 120 |
| 19 | IV (0.08) | 1 | 1950 | 42.3 | — | — |
| 20 | | 3 | 1000 | 65.1 | — | — |
| 21 | | 5 | 800 | 74.1 | — | — |
| 22 | V (0.08) | 1 | 1550 | 43.5 | — | — |
| 23 | | 3 | 1150 | 65.8 | — | — |
| 24 | | 5 | 1000 | 73.6 | — | — |

[a]Gram moles of Compound IV or V per 100 grams of poly(vinyl chloride) resin, corresponding to 3.2 phr and 5.0 phr of Compounds IV and V, respectively, for each 0.01 mol.
[b]Extraction data are the averages of three determinations per sample.
[c]Tensile strength and elongation are the averages of 10 determinations per sample.

It can be observed from the results in Table IV that the gel swell is significantly lower at 0.02, 0.04, and 0.06 gram mole levels, the percent of insolubles is significantly higher at 0.02 and 0.04 gram-mole levels, and the tensile strength is higher at comparable molar equivalent levels and radiation dosage for films containing the carbonylamino compound, i.e., formula V, than for films containing the simple dimethacrylate, i.e., formula IV. Differences in percent elongation, however, is less pronounced.

EXAMPLE 7

This example demonstrates a poly (vinyl chloride) composition containing a carbonylamino compound within the scope of Formula I wherein the carbonylamino compound is a thiocarbamylene.

Dithiol (HSCH₂CH₂SH) (9.4 ml) and triethylamine, N(C₂H₅)₃, (3 drops) were added to 100 ml of petroleum ether and the resulting mixture stirred to form a one-phase, homogeneous solution. Isocyanatoethylmethacrylate,

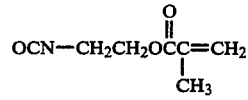

(31 g in 25 ml of petroleum ether) was slowly added to the solution, which was being cooled with an ice bath. As a solid began to form and the reaction mixture thickened, an additional 50 ml of petroleum ether was added.

The solid was filtered, redissolved and recrystallized three times from benzene. The recrystallized product was vacuum dried overnight at 40° C. The product was a white, granular crystalline material with a melting point of 93.5°–95° C. The product is represented by the following formula:

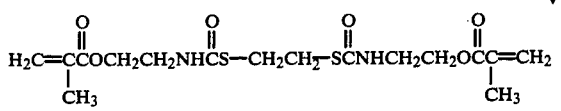

To 10 g of 15.9 weight percent poly(vinyl chloride) (Diamond ® 450) in tetrahydrofuran was added 0.5 g (30 phr) of compound VI in 1.5 g of tetrahydrofuran. The solution was cast in a knife coater with a 10 mil orifice. The clear film which resulted indicated that compound VI was compatible with poly(vinyl chloride).

EXAMPLE 8

This example demonstrates a poly(vinyl chloride) composition containing a carbonylamino compound within the scope of Formula I wherein the carbonylamino compound is a carbamylene.

Ethylene glycol (3.3 g) and isocyanotoethylmethacrylate (16.3 g) were introduced into a 100 ml flask equipped with a dry air tube. Several drops of dibutyltin dilaurate were then added. The temperature of the reaction mixture was maintained below 35° C. with an ice bath. The resulting product, recrystallized from toluene, had a melting point of 113°–115° C. The product is represented by the formula:

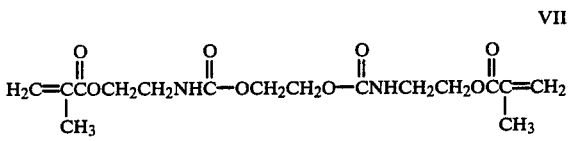

To 10 g of 15.93 weight percent poly (vinyl chloride) (Diamond ® 450) in tetrahydrofuran was added 0.48 g (30 phr) of compound VII. The solution was cast in a knife coater with a 10 mil orifice. The clear film which resulted indicated that compound VII was compatible with poly(vinyl chloride).

EXAMPLE 9

This example demonstrates a poly(vinyl chloride) composition containing a carbonylamino compound within the scope of formula I wherein the carbonylamino compound is a ureylene.

In a 500 ml flask fitted with a dry air tube containing 250 ml of tetrahydrofuran was dissolved ethylenediamine (3.18 g) with stirring. Isocyanatoethylmethacrylate (16.3 g) was added slowly and allowed to react overnight. The resulting product was filtered, air dried, and recrystallized from tetrahydrofuran. The product, which has a melting point of 150° C., is represented by the formula:

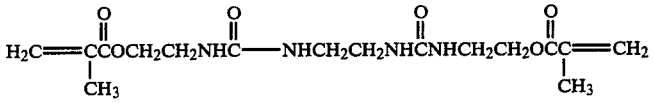

To 10 g of a composition containing 93.5 percent by weight poly(vinyl chloride) resin (Vigen ® 65, General Tire Company), 2.6 percent by weight processing aid (Acryloid ® K120N, Rohm and Haas Company), 0.6 percent by weight lubricant (Loxial G-70, Henkel AG), 3.3 percent by weight (Mark ® 649A, Argus Chemical Co.) was added 1.0 g of the compound represented by formula VIII. The mixture was blended with a mortar and pestle and pressed at 370° C. for 30 seconds at 30,000 lbs. on a 10 cm diameter ram. The resulting clear film indicated that the compound of formula VIII was compatible with poly(vinyl chloride).

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An article comprising a substrate bearing a coating prepared from a composition comprising a poly(vinyl chloride) resin and a vinyl chloride resin-compatible compound having (a) two to six terminal or pendant ethylenically-unsaturated groups, (b) two or more groups selected from divalent carbonylamino groups, divalent thiocarbonylamino groups, or both, and (c) polyvalent aliphatic group, Z, where Z represents the polyvalent residue remaining after the removal of hydroxyl or amino groups from an oligomeric nucleophilic compound, $Z(XH)_n$, Z containing carbon and hydrogen atoms, and having a molecular weight of 500 to 5000, where X represent —O— or

in which $R^2$ is hydrogen or lower alkyl group, and where n represents an integer having a value of 2 to 6, provided that there is at least one divalent carbonylamino or thiocarbonylamino group per ethylenically-unsaturated group, the amount of said vinyl chloride resin-compatible compound being sufficient so that upon exposure of the composition to actinic radiation, a gel is formed, provided that a film formed from a composition comprising poly(vinyl chloride) resin and about 10 percent by weight of said vinyl chloride resin-compatible compound remains transparent when pressed at elevated temperatures near the fusing point of the composition of poly(vinyl chloride) resin and said vinyl chloride resin-compatible compound.

2. The article of claim 1 wherein said vinyl chloride resin-compatible compound has the following formula:

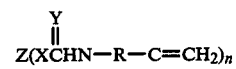

wherein

Z represents the polyvalent residue remaining after the removal of hydroxyl or amino group from an oligomeric nucleophilic compound, $Z(XH)_n$, Z containing carbon and hydrogen atoms, and having a molecular weight of 500 to 5000;

X represent —O— or

in which $R^2$ is hydrogen or lower alkyl group;
Y represents O or S;
R represents a divalent radical selected from the group consisting of

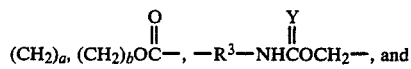

Pin which a is an integer from 1 to 6, b is an integer from 2 to 6, $R^3$ is an alkylene group, a divalent carbocyclic aliphatic group with 5 or 6 ring members, or an arylene group, Y is 0 or S;
$R^1$ represents hydrogen or methyl; and
n is an integer having a value of 2 to 6.

3. The article of claim 1 wherein said substrate is one or more wires.

4. The article of claim 2 wherein said substrate is one or more wires.

5. The article of claim 1 wherein said substrate bears on at least one surface thereof a coating prepared from the composition of claim 1.

6. The article of claim 2 wherein said substrate bears on at least one surface thereof a coating prepared from the composition of claim 2.

7. The article of claim 1 comprising a substrate bearing a film prepared from the composition of claim 1 and further bearing a layer of adhesive on at least one major surface thereof.

8. The article of claim 2 comprising a substrate bearing a film prepared from the composition of claim 2 and further bearing a layer of adhesive on at least one major surface thereof.

9. The article of claim 1 wherein said composition further includes up to 50 parts by weight of plasticizer per hundred parts by weight poly(vinyl chloride) resin, provided that there is no more than 100 parts in total of said vinyl chloride resin-compatible compound and said plasticizer per hundred parts by weight poly(vinyl chloride) resin, and there is no more than one part of plasticizer per part of vinyl chloride resin-compatible compound.

10. The article of claim 1 wherein said composition further includes up to 25% by weight, based on weight of total composition, of a reactive diluent monomer, said monomer being ethylenically-unsaturated.

11. The article of claim 1 wherein said composition comprises 5 to 100 parts by weight vinyl chloride resin-compatible compound per 100 parts by weight poly(vinyl chloride) resin.

12. The article of claim 1 wherein said composition further includes up to 10 parts by weight of a source of free radicals per 100 parts by weight poly(vinly chloride) resin.

13. The article of claim 1 wherein Z further contains oxygen atoms.

14. The article of claim 2 wherein Z further contains oxygen atoms.

* * * * *

UNITED STATES PATENT AND TRADEMARK OFFICE
CERTIFICATE OF CORRECTION

PATENT NO. : 4,631,229

DATED : December 23, 1986

INVENTOR(S) : John A. Martens and Brian H. Williams

It is certified that error appears in the above-identified patent and that said Letters Patent is hereby corrected as shown below:

Col. 2, line 56, "preperably" should read --preferably--.

Col. 2, line 66, "polyos" should read --polyols--.

Col. 3, line 37, "and (2)"   (2) should start a new line

Col. 3, line 65, "poly(vinyll chloride)" should read --poly(vinyl chloride)--.

Col. 4, line 17, "50,000 to 120,00" should read --50,000 to 120,000--.

Col. 9, line 28, "(2-methacryloxyethyl)-n" should read --(2-methacryloxyethyl)-s--.

Col. 11, line 57, "$\gamma$-caprolactone" should read --$\varepsilon$-caprolactone--.

Col. 22, line 25, "represent" should read --represents--.

Col. 23, line 18, "Pin" should read --in--.

UNITED STATES PATENT AND TRADEMARK OFFICE
CERTIFICATE OF CORRECTION

PATENT NO. : 4,631,229

DATED : December 23, 1986

INVENTOR(S) : John A. Martens and Brian H. Williams

It is certified that error appears in the above-identified patent and that said Letters Patent is hereby corrected as shown below:

Col. 24, line 28, "poly(vinly chloride)" should read --poly(vinyl chloride).

Signed and Sealed this

Tenth Day of March, 1987

Attest:

DONALD J. QUIGG

Attesting Officer

Commissioner of Patents and Trademarks